United States Patent Office 3,573,928
Patented Apr. 6, 1971

3,573,928
PROCESS FOR PRODUCING BEER
Nicholas G. Marotta, Green Brook, Harvey Bell, North Plainfield, and Gary Bud Charlick, Somerville, N.J., assignors to National Starch and Chemical Corporation, New York, N.Y.
No Drawing. Filed Jan. 21, 1969, Ser. No. 792,806
Int. Cl. C12h 1/14
U.S. Cl. 99—48                                    20 Claims

ABSTRACT OF THE DISCLOSURE

A process for preparing a beer which, after being poured, forms a voluminous, creamy-textured and long-lasting foam. The process comprises the addition to the beer, in specified amounts, of a dextrinized starch acid-ester of a substituted dicarboxylic acid.

THE INVENTION

This invention relates to a novel process for producing fermented malt beverages, such as beer, ale, porter, or stout, which are characterized by the voluminous, creamy-textured and long-lasting foams, or heads, which they produce upon being poured into a glass or other drinking vessel. In another aspect, the invention relates to the improved malt beverages which result from the latter process.

BACKGROUND OF THE INVENTION

As is well-recognized today, the formation, on pouring, of an ample volume of foam, or head, possessing both good texture and stability, is an important and desirable characteristic of beers and other malt beverages providing them with a desirable appearance of freshness, quality and good taste. In contrast, a beer, or like beverage, which exhibits a relatively small and short-lived foam, or head, presents a generally unappealing and undesirable appearance which at times may be mistaken for its being "flat."

While many types of additives, such as gum arabic and algin, which are intended to enhance the quantity and quality of foam, are known and utilized in the brewing industry, all of them suffer to a degree from one or more shortcomings or defects. For example, certain additives which may enhance foam volume and foam stability to some extent produce undesirable effects on the taste, clarity, or other properties of the beer.

It is an object of this invention to provide fermented malt beverages which, on being poured, yield voluminous, creamy-textured and long-lasting foams, or heads, while possessing all of the other properties such as good taste, clarity, and the like which are ordinarily desired in such beverages.

It is a further object to provide a process for producing fermented malt beverages having the property of yielding a voluminous, creamy-textured and long-lasting foam.

Other objects and advantages of this invention will become apparent from the following description thereof.

DETAILED DESCRIPTION

We have found that the objects of our invention are accomplished by the introduction, as an additive to a fermented malt beverage, of a dextrin derived from a particular type of chemically modified starch. While this dextrin is ordinarily admixed with the beverage during the later stages of the brewing process, it has been found that it can also be introduced during the earlier stages. Thus, the dextrin can be introduced into the mash either prior to, during, or subsequent to the completion of fermentation. Where the dextrin is introduced during the earlier stages of the brewing process, the beverage with the dextrin admixed therewith may be further processed and microfiltered without losing any of the intended benefits.

Microfiltration is particularly useful with unpasteurized or draft beers in order to retard or prevent their subsequent deterioration as a result of the action of bacterial microorganisms. Certain foam stabilizing additives, such as algin and algin-based additives, tend to clog the filtering medium and, to some extent, are themselves filtered from the liquid. It is therefore, a distinct advantage of the dextrinized starch acid-ester additives which are utilized in the process of this invention that they neither interfere with nor are they removed by the microfiltration procedure. Their introduction is thus permitted at a point in time during the brewing process which may be prior to the latter microfiltration procedure.

The foam enhancing additives utilized in the process of this invention comprise dextrins derived from starch acid-esters of substituted dicarboxylic acids. Such starch acid-esters may be represented diagrammatically by the following formula:

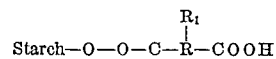

wherein R is a radical selected from the class consisting of $R_1$ substituted ethylene and $R_1$ substituted propylene radicals; and $R_1$ is a hydrocarbon radical selected from the class consisting of alkyl, alkenyl, aralkyl, and aralkenyl radicals.

The starch acid-esters are prepared by reacting an ungelatinized starch, in an alkaline medium, with a substituted cyclic dicarboxylic acid anhydride having the following formula:

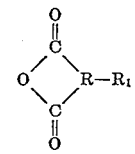

wherein R and $R_1$ represent the same substituent groups referred to hereinabove for these symbols. Substituted cyclic dicarboxylic acid anhydrides falling within this formula are the substituted succinic and glutaric acid anhydrides. Further details for the preparation of these starch derivatives may be found in U.S. Pat. 2,661,349 which issued on Dec. 1, 1953.

These acid-ester starches, which are later dextrinized to yield the foam enhancing additives utilized in our novel process, may be prepared from such starches as waxy maize, waxy sorghum, sorghum, potato, tapioca, sago, corn, rice, and wheat. These starch bases may be in their raw, unmodified state or they may have been previously modified in any desired manner, as for example, by hydrolysis, oxidation, esterification or etherification. The applicable starch bases should be in an ungelatinized form, i.e. in the form of their original intact granules.

As is well-known in the art, dextrins are the conversion products formed by the incomplete hydrolysis of starch or a derivatized starch, ordinarily as a result of the action of dilute acids or by heating of the dry raw starch or starch derivative base. In converting the above described starch acid-ester derivatives into dextrins, one may employ any of the usual dextrinization procedures well-known to those skilled in the art, including the treatment of the starch derivative with either heat and/or acid, or by any means desired by the practicioner. It should be noted that when reference is made to "dextrins" in describing the process of this invention, we also contemplate, as included therein, the degraded starch products prepared either by means of a process wherein the applicable starch derivatives are converted with acids or oxidizing agents, in the presence of water, at superatmospheric pressures, and temperatures in excess of about 212° F., or by means of an enzyme conversion procedure utilizing such enzymes as alpha-amylase. Additional information relating to the dextrinization of starches, in addition to the descriptive examples herein, may also be obtained by reference to chapters XII–XIII of "Chemistry and Industry of Starch" by R. W. Kerr, 2nd edition, published in 1950, Academic Press, New York, N.Y.

In using these starch acid-ester dextrins as foam enhancing additives in accordance with the process of this invention, it is convenient to first dissolve them in water so as to form a dilute solution ocntaining from about 2 to 8%, by weight, of dextrin solids; the latter step thereby facilitating their addition and even distribution into the liquid mash or beer. In order to be of optimum value in the process of this invention, the dextrins should have a solubility of at least 50%, by weight, in water at about 72° F. Mild heating, in the range of about 130° F., may be required in order to dissolve the starch acid-ester dextrin. In practice, the dilute solution of the additive may be added directly into the liquid mash or beer. Thus, for example, it may be added to the mash in the fermentation tank or, if desired, directly into the mash in the holding tank. No special procedures are required for the latter step which may take place at any point in the brewing process prior to the final containerization, i.e. bottling or canning, etc. of the resulting beverage.

We have found that the concentration of the starch acid-ester dextrin which is required for effecting the improved volume, quality and stability of the foam of the resulting malt beverage is from about 0.008 to 0.016%, by weight, based on the total weight of the malt beverage. The addition of more than the above-specified maximum concentration of the dextrin additive, while not producing any harmful effects, does not, however, tend to produce superior foam enhancement. The addition of less than the required minimum concentration of the dextrin additive will not, of couse, result in the preparation of beverages displaying the desired improved foam characteristics.

The following examples will more fully illustrate the embodiment of our invention. In these examples, all parts given are by weight unless otherwise noted.

EXAMPLE I

This example illustrates the preparation and subsequent use as a foam enhancing additive, in the process of this invention, of a starch acid-ester dextrin.

The starch acid-ester dextrin prepared and utilized in this example comprised a dextrinized waxy maize acid-ester of a substituted succinic acid, derived from octenyl succinic acid anhydride. The acid-ester base was prepared according to the procedure described in Example II of U.S. Pat. 2,661,349 with the exception that the starch base employed was a waxy maize starch and the amount of octenyl succinic acid anhydride used was 3% based on the weight of the starch.

In converting this waxy maize acid-ester into a dextrin, it was acidified with dilute hydrochloric acid until its pH, as measured by suspending one part of the acidified starch in four parts of water, was at a level of about 3. This conversion was carried out on a belt type converter running at a 15 minute heating period wherein the final temperature was 375° F.

The resulting dextrin was off-white in color and was free from the taste and aroma ordinarily associated with dextrins. The solubility of the resulting dextrin was greater than 50%, by weight, in water at 72° F. The viscosity of this dextrin, as expressed in terms of its anhydrous borax fluidity value, hereinafter referred to as the ABF value, was 2.77. (The ABF value is defined as the ratio of the amount of water to the amount of dextrin when the latter is cooked for 5 minutes at 195° F. with 15% of borax on the weight of dextrin, so as to provide a dispersion having a viscosity, when cooled to 77° F., of 70 centipoises.)

The thus-prepared dextrin was then tested for its effectiveness as a foam enhancing additive in the following manner. A solution was prepared from the resulting dextrin product by dissolving three parts of the dextrine in 97 parts of water with mild heating being applied. The 12-ounce bottles of beer were then uncapped. Into the first bottle, there was added 1.0 milliliter of the 3% solution of dextrin; 1.8 milliliter was added to the second bottle; and 1.0 milliliter of water was added to the third bottle which served as a control. All of the bottles were recapped and allowed to remain for 12 hours at 40° F. whereupon each bottle was then opened and poured, essentially in the same manner, into a funnel having a constricted orifice, about one-half inch in diameter which was directed into a modified measuring cylinder. The volume which the resulting foam occupied when the pouring was completed was recorded as the initial volume.

It may be noted at this point, that the amount of foam which is intially formed on pouring the beer is influenced by a number of variables including, for example, the degree of carbonation present in the beer, its temperature, its alcoholic content, and the rate and manner of pourng. In our testing procedures the differences in the latter variables, as between the samples and the controls, were minimized as much as possible.

After a period of 5 minutes the volume of foam was again noted. Table I, hereinbelow, summarizes the results obtained.

TABLE I

| Concentration of dextrin, percent | Foam volume, intial, ml. | Foam volume after five minutes, ml. |
|---|---|---|
| 0.008 | 115 | 43 |
| 0.015 | 125 | 45 |
| Control | 85 | 29 |

The above results clearly demonstrate that the addition of the starch acid-ester dextrin, according to the process of this invention, served to provide the treated beer samples with heads which had a substantially greater initial volume than that observed in the control sample. Moreover, the resulting heads of the treated samples were not only greater in volume but were characterized by a finer, creamier texture than that observed in the control.

In a repetition of the above described procedure, ale, malt liquor, and stout were each, in turn, substituted for the beer which had originally been utilized. In each case it was observed that the initial volume of foam produced in samples of the latter beverages to which the dextrinized starch acid-ester had been added was substantially greater than that produced in the control to which the dextrin had not been introduced.

EXAMPLE II

This example further illustrates the preparation and subsequent use as foam enhancing additives, in the process of this invention, of additional varieties of starch acid-ester dextrins.

The procedure utilized to prepare the starch acid-ester dextrins of this example was identical to that set forth in Example I, hereinabove, with the exceptions that:

(1) a tapioca starch and a potato starch were each, in turn, substituted for the waxy maize starch utilized therein;

(2) the amount of octenyl succinic acid anhydride used was 5%, based on the weight of the starch base; and (3) the dextrinization of each of the resulting starch acid-esters was accomplished by preparing an aqueous slurry containing 30%, by weight, of the starch acid-ester, having a pH level of 7.0, and 0.025%, by weight, of alpha-amylase. The resulting slurry was then heated to a temperature of 95° C. at a rate of 3° to 5° C. per minute. This temperature was maintained for a period of 20 minutes in order to inactivate the enzyme, whereupon the resulting solution was cooled to room temperature. The solution was then acidified by means of the addition of hydrochloric acid. In each case, the solubility of the resulting dextrins was over 50%, by weight, in water at 72° F. The ABF values of the resulting dextrinized products were as indicated in Table II, hereinbelow, which summarizes the results obtained when the thus-produced dextrins were tested substantially in the manner described in Example I, hereinabove.

TABLE II

| Starch base | ABF value | Concentration of dextrin, percent | Foam volume initial, ml. | Foam volume after 5 min. ml. |
| --- | --- | --- | --- | --- |
| 1. Tapioca | 2.79 | 0.008 | 64 | 14 |
| 2. Tapioca | 3.25 | 0.008 | 60 | 10 |
| 3. Potato | 2.93 | 0.008 | 58 | 8 |
| 4. Potato | 1.86 | 0.008 | 48 | 8 |
| 5. Control | | 0.0 | 40 | 6 |

The above results clearly demonstrate the substantially greater volume of foam which was initially produced in the samples treated with the various dextrinized starch acid-esters according to the process of this invention. Moreover, in each instance, the resulting heads were characterized by a finer, creamier texture than that observed in the control.

It will be noted that, as compared with the other three samples, sample No. 4, having an ABF value of 1.86, produced the smallest increase in initial foam volume over the control. We have found that starch acid-ester dextrins having ABF values lower than about 2.5 do not produce a foam enhancing effect as great as do those dextrins which have ABF values above 2.5. For this reason we prefer to use dextrins in the process of this invention having an ABF value of at least about 2.5.

EXAMPLE III

This example illustrates the use of two other dextrinized starch acid-esters in the process of this invention.

The starch acid-ester bases used to prepare the dextrins of this example were prepared substantially according to the procedure described in Example II of U.S. Pat. 2,661,349. The starch base employed herein, however, was waxy maize starch. In one instance, 2.53% of nonenyl succinic acid anhydride and, in the other instance, 0.38% of dodecenyl succinic acid anhydride, based on the weight of the starch, were used to prepare the starch acid-ester.

The waxy maize acid-esters were dextrinized by treatment with acid and heat substantially as described in Example I, hereinabove. The ABF value of the nonenyl succinate derivative was 2.94 while that of the dodecenyl succinate derivative was 2.70.

When the thus-produced dextrins were tested in beer, substantially as described in Example I, hereinabove, excellent foam enhancement was obtained. The resulting heads of the treated samples were also characterized by a finer, creamier texture than that observed in the control.

EXAMPLE IV

This example illustrates the use of a starch acid-ester dextrin in the process of this invention wherein, in this case, the dextrin was introduced prior to the final filtration of the beer.

Beer was fermented in the usual manner with the exception that during the time the beer was in the holding tank prior to its being filtered for the last time before its being bottled, it was admixed with an 8%, by weight, aqueous solution of dextrin in a quantity sufficient to yield a 0.008%, by weight concentration of dextrin based on the total weight of the beer. The dextrin used was a waxy maize acid-ester of a substituted succinic acid, derived from octenyl succinic acid anhydride, prepared as described in Example I, hereinabove. The dextrin had an ABF value of 2.77. The beer was thereafter filtered and bottled.

Samples of this bottled beer showed enhanced foam characteristics when poured as compared to beer prepared in the same manner but without the addition of the dextrinized starch acid-ester.

Summarizing, our invention is thus seen to provide a beer having improved foam characteristics as particularly manifested by its increased initial foam volume, and a process for the preparation thereof. Variations may be made in proportions, procedures and materials without departing from the scope of this invention which is limited only by the following claims.

What is claimed is:

1. A fermented malt beverage containing, as a foam enhancing additive dissolved therein, a small but effective amount of a dextrinized starch acid-ester of a substituted dicarboxylic acid having the formula:

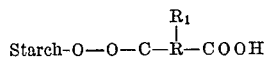

wherein R is a radical selected from the group consisting of $R_1$ substituted ethylene and $R_1$ substituted propylene radicals, and $R_1$ is a hydrocarbon radical selected from the class consisting of alkyl, alkenyl, aralkyl, and aralkenyl radicals.

2. The fermented malt beverage of claim 1, wherein said foam enhancing additive is present therein in a concentration of from about 0.008 to 0.016 part, by weight, per one hundred parts, by weight, of said beverage.

3. The fermented malt beverage of claim 1, wherein said foam enhancing additive is a dextrinized starch acid-ester of a substituted succinic acid, derived from octenyl succinic acid anhydride.

4. The fermented malt beverage of claim 1, wherein said foam enhancing additive comprises a dextrinized starch acid-ester of a substituted dicarboxylic acid having an ABF value of not less than about 2.5.

5. A beer containing, as a foam enhancing additive dissolved therein, a small but effective amount of a dextrinized starch acid-ester of a substituted dicarboxylic acid having the formula:

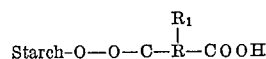

wherein R is a radical selected from the group consisting of $R_1$ substituted ethylene and $R_1$ substituted propylene radicals, and $R_1$ is a hydrocarbon radical selected from the class consisting of alkyl, alkenyl, aralkyl, and aralkenyl radicals.

6. The beer of claim 5, wherein said foam enhancing additive is present therein in a concentration of from about 0.008 to 0.016 part, by weight, per one hundred parts, by weight, of said beverage.

7. The beer of claim 5, wherein said foam enhancing additive is a dextrinized starch acid-ester of a substituted succinic acid, derived from octenyl succinic acid anhydride.

8. The beer of claim 5, wherein said foam enhancing additive comprises a dextrinized starch acid-ester of a substituted dicarboxylic acid having an ABF value of not less than about 2.5.

9. An ale containing, as a foam enhancing additive dissolved therein, a small but effective amount of a dextrinized starch acid-ester of a substituted dicarboxylic acid having the formula:

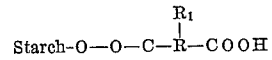

wherein R is a radical selected from the group consisting of $R_1$ substituted ethylene and $R_1$ substituted propylene radicals, and $R_1$ is a hydrocarbon radical selected from the class consisting of alkyl, alkenyl, aralkyl, and aralkenyl radicals.

10. The ale of claim 9, wherein said foam enhancing additive is present therein, in a concentration of from about 0.008 to 0.016 part, by weight, per one hundred parts, by weight, of said beverage.

11. The ale of claim 9, wherein said foam enhancing additive is a dextrinized starch acid-ester of a substituted succinic acid, derived from octenyl succinic acid anhydride.

12. The ale of claim 9, wherein said foam enhancing additive comprises a dextrinized starch acid-ester of a substituted dicarboxylic acid having an ABF value of not less than about 2.5.

13. A method for preparing fermented malt beverages which comprises adding to the said malt beverage, as a foam enhancing additive, at any time prior to final containerization, a small but effective amount of a dextrinized starch acid-ester of a substituted dicarboxylic acid having the formula:

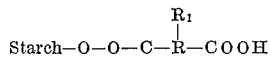

$$\text{Starch—O—O—C—R—COOH}$$

wherein R is a radical selected from the group consisting of $R_1$ substituted ethylene and $R_1$ substituted propylene radicals, and $R_1$ is a hydrocarbon radical selected from the class consisting of alkyl, alkenyl, aralkyl, and aralkenyl radicals.

14. The method of claim 13, wherein said foam enhancing additive is added in a concentration of from about 0.008 to 0.016 part, by weight, per one hundred parts, by weight, of said beverage.

15. The method of claim 13, wherein said foam enhancing additive is a dextrinized starch acid-ester of a substituted succinic acid, derived from octenyl succinic acid anhydride.

16. The method of claim 13, wherein said foam enhancing additive comprises a dextrinized starch acid-ester of a substituted dicarboxylic acid having an ABF value of not less than about 2.5.

17. A method for preparing fermented malt beverages which comprises adding to the said malt beverage, as a foam enhancing additive, a small but effective amount of a dextrinized starch acid-ester of a substituted dicarboxylic acid having the formula:

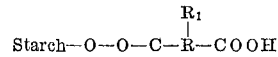

$$\text{Starch—O—O—C—R—COOH}$$

wherein R is a radical selected from the group consisting of $R_1$ substituted ethylene and $R_1$ substituted propylene radicals, and $R_1$ is a hydrocarbon radical selected from the class consisting of alkyl, alkenyl, aralkyl, and aralkenyl radicals.

18. The method of claim 17, wherein said foam enhancing additive is added in a concentration of from about 0.008 to 0.016 part, by weight, per one hundred parts, by weight, of said beverage.

19. The method of claim 17, wherein said foam enhancing additive is a dextrinized starch acid-ester of a substituted succinic acid, derived from octenyl succinic acid anhydride.

20. The method of claim 17, wherein said foam enhancing additive comprises a dextrinized starch acid-ester of a substituted dicarboxylic acid having an ABF value of not less than about 2.5.

References Cited

UNITED STATES PATENTS

| | | | |
|---|---|---|---|
| 2,661,349 | 12/1953 | Caldwell et al. | 260—224 |
| 3,266,902 | 8/1966 | Wilkes | 99—48 |

LIONEL M. SHAPIRO, Primary Examiner

D. M. NAFF, Assistant Examiner